United States Patent [19]

Philippe et al.

[11] Patent Number: 5,626,718

[45] Date of Patent: May 6, 1997

[54] USE OF POLYMERS IN THE RECYCLED FIBER WASHING/DEINKING PROCESS

[75] Inventors: Irenee J. Philippe; Frank J. Sutman; Thomas E. Taggart; Mary B. K. Letscher; Michael A. Schuster; John C. Harrington, IV, all of Jacksonville, Fla.

[73] Assignee: Betz Laboratories, Inc., Trevose, Pa.

[21] Appl. No.: 307,969

[22] Filed: Sep. 16, 1994

[51] Int. Cl.⁶ ............................................. D21C 9/02
[52] U.S. Cl. ........................ 162/60; 162/55; 162/4; 162/72; 162/164.1; 162/168.5; 162/168.1
[58] Field of Search ........................ 162/60, 72, 55, 162/168.1, 168.5, 164.1, 4, 5, 6; 210/702, 703, 728, 733, 734, 694, 689

[56] References Cited

U.S. PATENT DOCUMENTS

| | | |
|---|---|---|
| 3,461,163 | 8/1969 | Boothe ................................ 564/296 |
| 3,920,599 | 11/1975 | Hurlock et al. ..................... 260/29.64 |
| 4,077,930 | 3/1978 | Lim et al. ........................ 260/29.6 TA |
| 4,147,681 | 4/1979 | Lim et al. ........................ 260/29.6 TA |
| 4,464,508 | 8/1984 | Easterly, Jr. ........................... 524/787 |
| 4,544,490 | 10/1985 | Erickson et al. ...................... 210/713 |
| 4,705,640 | 11/1987 | Whittaker ............................. 210/733 |
| 4,720,346 | 1/1988 | Flesher et al. ........................ 210/734 |
| 4,738,750 | 4/1988 | Ackel .................................... 162/29 |
| 4,780,179 | 10/1988 | Clement ................................... 162/5 |
| 4,792,406 | 12/1988 | Allenson et al. ...................... 210/734 |
| 4,943,378 | 7/1990 | Flesher et al. ........................ 210/734 |
| 4,969,976 | 11/1990 | Reed .................................. 162/164.3 |
| 5,013,456 | 5/1991 | St. John et al. ...................... 210/734 |
| 5,213,693 | 5/1993 | McGrow et al. ...................... 210/728 |
| 5,286,390 | 2/1994 | Gray et al. ............................ 210/727 |
| 5,332,474 | 7/1994 | Maxham ............................... 162/189 |

Primary Examiner—Donald E. Czaja
Assistant Examiner—Jose A. Fortuna
Attorney, Agent, or Firm—Biebel & French

[57] ABSTRACT

The present invention is directed to a method for increasing the retention on a washing/thickening device in an aqueous papermaking system. The method generally comprises adding to the furnish solids of the system an effective amount of a cationic polyacrylamide polymer.

32 Claims, 3 Drawing Sheets

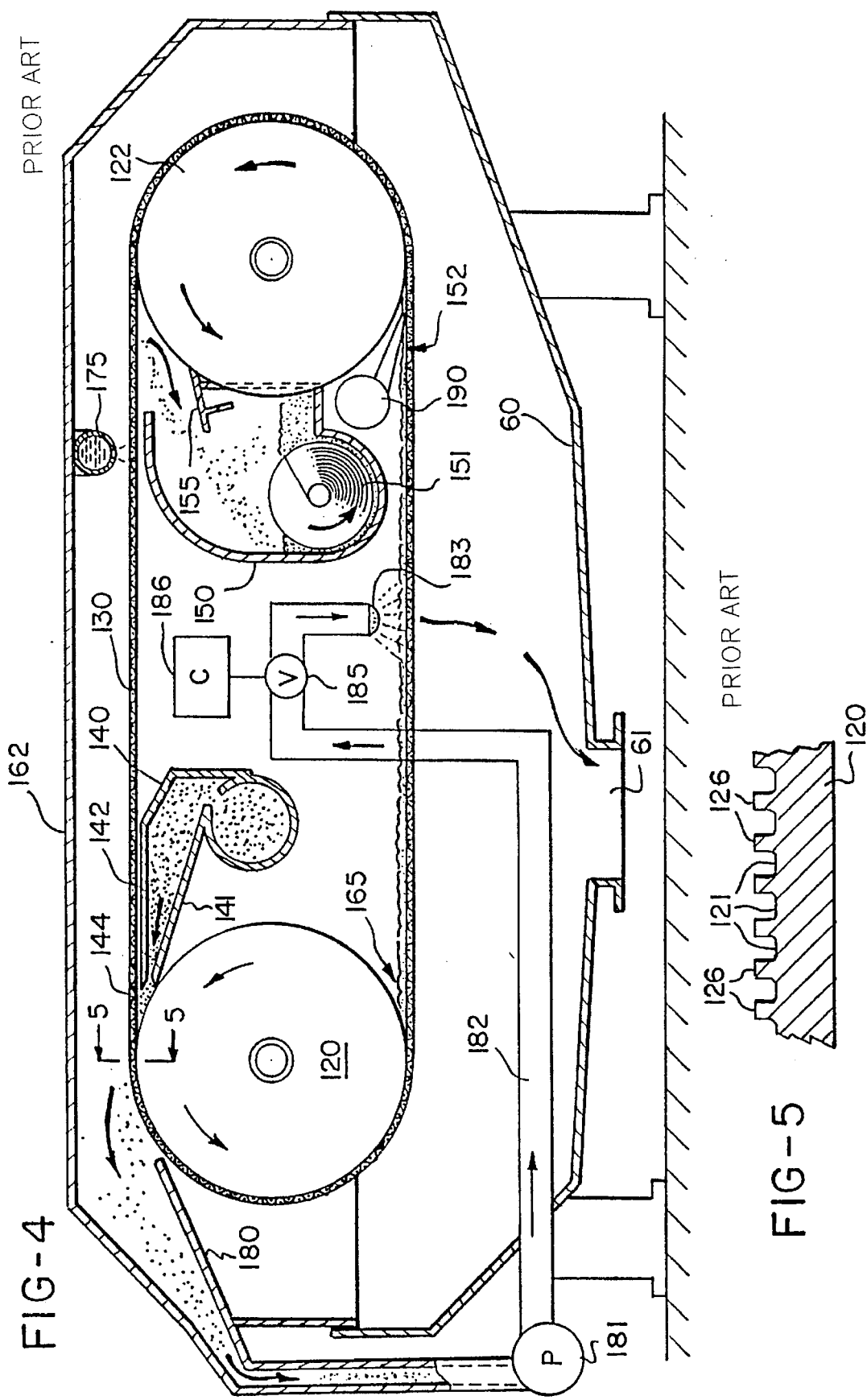

USE OF POLYMERS IN THE RECYCLED FIBER WASHING/DEINKING PROCESS

FIELD OF THE INVENTION

The use of recycled fibers is becoming an important aspect of papermaking both for economic and environmental reasons. The basic manufacturing steps in the use of recycled fiber include the repulping of recovered paper, followed by the removal of printing inks from the fibers.

A typical deinking process utilizes a combination of chemical and mechanical techniques in several stages, whereby the ink is physically removed from the fiber. The accepts (or fiber) from the deinking step are then typically treated through a series of washers and cleaners, in order to further remove contaminants and improve fiber quality. A dynamic washing/thickening device, such as a double nip thickener (DNT), is one such mechanical device commonly utilized. This high speed washing/thickening device serves to remove ink and filler particles from the fibrous slurry.

Polymeric additives are commonly utilized in the papermaking process in order to coagulate/flocculate the fiber/filler slurry, thus improving dewatering or retention of fine particles. These polymeric additives may be used as retention aids, drainage aids, clarification aids, sludge dewatering aids, etc., depending upon the application in which they are employed. Polymers have not been known to be employed, nor was their use successful, with a dynamic belt washer/thickener.

The present invention relates to the use of a cationic polyacrylamide polymer to increase the efficiency of a dynamic washing/thickening device utilized in the papermaking/deinking processes. This polymer is preferably a high molecular weight cationic flocculant.

The invention will be further described in conjunction with the following detailed description and attached drawings.

DRAWINGS

FIG. 4 is a view similar to FIG. 1 showing a modified prior art DNT; and

FIG. 5 is an enlarged fragmentary section taken along the line 5—5 shown in FIG. 4.

DETAILED DESCRIPTION OF THE INVENTION

Figure 1:
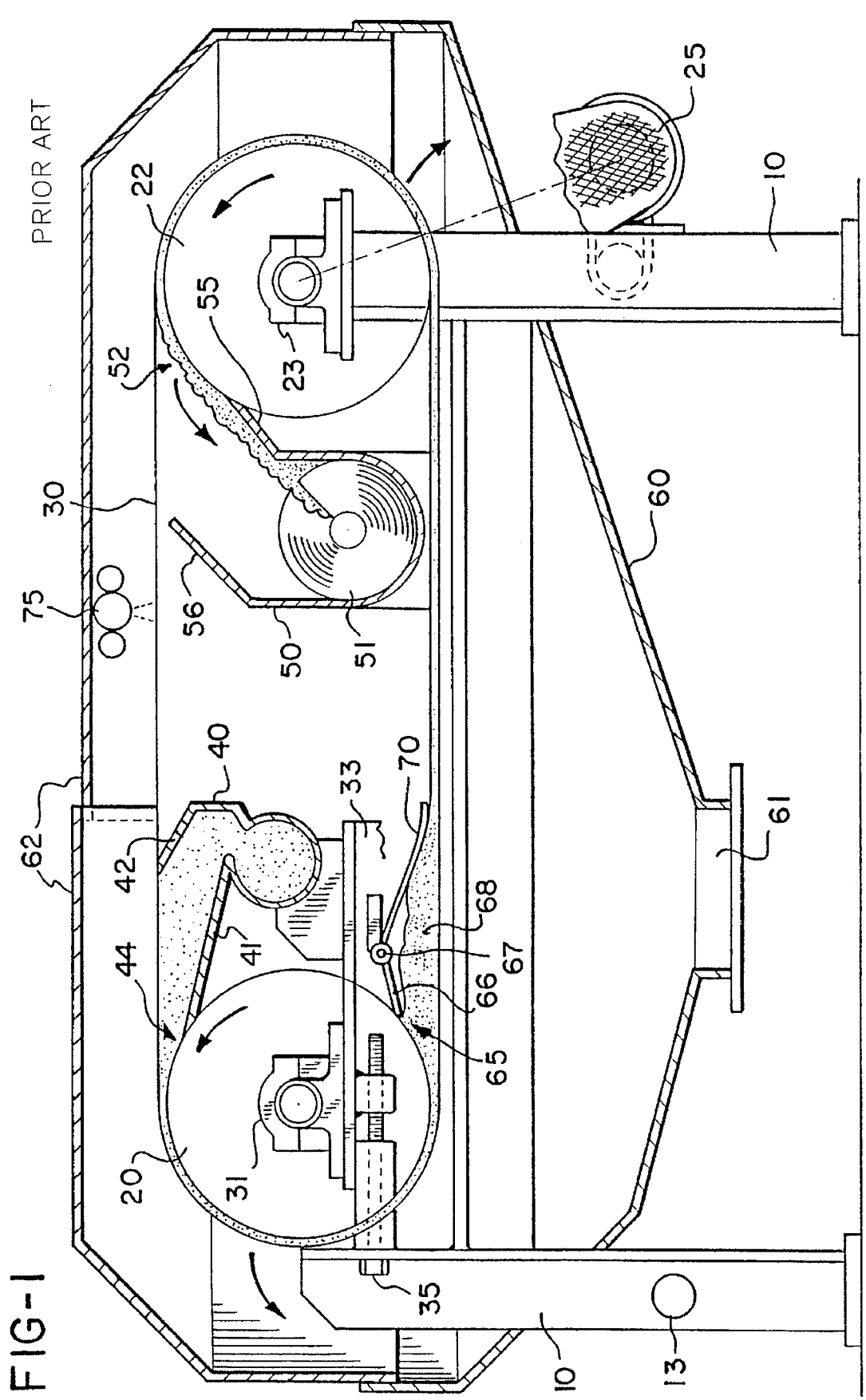
FIG. 1 is a diagrammatic side view of a prior art D.N.T. thickening apparatus.

The papermaking industry continually strives to improve productivity and efficiency. The present invention provides improved production by increased washer/thickener retention. This results in increased washer/thickener capacity and overall deink plant production capacity. Another result of improved retention is a lower solids content in the washer/thickener filtrate. Lower filtrate solids allow for less polymer usage in the clarifier, less sludge thickening and lower landfill costs.

Field studies were conducted at a northeast newsprint deinking mill, wherein old newsprint (ONP) and magazines were repulped and deinked for use in the papermaking process. The subject mill utilized alkaline and acid deinking loops, in series, in order to treat the paper stock. Both the alkaline and acid loops contained DNT washers. The accepts from the DNT were further processed as fiber for use in the papermaking process; the filtrate was then sent to a Dissolved Air Flotation (DAF) clarifier for further solids removal. The respective loops employ two or more Double Nip Thickeners (DNTs) in parallel, thus the influent flow is identical for the DNTs in a specific loop. This system permits evaluation of polymeric additives by comparing the filtrate and accepts fibrous slurry solids of treated and non-treated DNTs.

A high molecular weight cationic polyacrylamide was fed at various dosage levels in the approach loop piping to the DNT. The following data demonstrates the improvements provided with the use of a polymer. The polymer utilized in these studies was a high molecular weight linear 40/60 AETAC/acrylamide copolymer.

TABLE I

| | | | | | | | | |
|---|---|---|---|---|---|---|---|---|
| | | | colspan="6" | Northeast Mill Polymeric Additive to DNT Acid Loop | | | | |
| | Polymer | | | Accepts[1] | | Filtrate[1] | | % Retention[2] | |
| Time | Dose lb/ton | Influent Flow[1] | Non-Treated | Treated | Non-Treated | Treated | Non-Treated | Treated |
| 1630 | 0.5 | 1.03 | 9.3 | 9.7 | 0.30 | 0.27 | 70.9 | 73.8 |
| 1715 | 1.0 | 1.02 | 9.2 | 12.8 | 0.33 | 0.26 | 67.6 | 74.5 |
| 1830 | 1.5 | 1.16 | 8.1 | 11.9 | 0.28 | 0.18 | 75.9 | 84.5 |
| 1930 | 1.5 | 1.29 | 9.3 | 13.1 | 0.28 | 0.14 | 78.3 | 89.1 |
| 2030 | 2.0 | 1.12 | 10.5 | 13.2 | 0.26 | 0.10 | 76.8 | 91.1 |
| 2130 | 2.5 | 0.92 | 9.4 | 12.1 | 0.26 | 0.12 | 71.7 | 87.0 |
| 2230 | 3.0 | 1.04 | 8.9 | 12.6 | 0.26 | 0.12 | 75.0 | 88.5 |

TABLE II

Northeast Mill Polymeric Additive to DNT Alkaline Loop

| Polymer | | | Accepts[1] | | Filtrate[1] | | % Retention[2] | |
|---|---|---|---|---|---|---|---|---|
| Time | Dose lb/ton | Influent Flow[1] | Non-Treated | Treated | Non-Treated | Treated | Non-Treated | Treated |
| 1715 | 1.0 | 1.13 | 10.5 | 9.3 | 0.51 | 0.47 | 54.9 | 58.4 |
| 1830 | 1.5 | 1.18 | 8.4 | 9.0 | 0.54 | 0.51 | 54.2 | 56.8 |
| 1930 | 1.5 | 1.23 | 8.8 | 9.2 | 0.57 | 0.54 | 53.7 | 56.1 |
| 2030 | 2.0 | 0.96 | 8.2 | 9.9 | 0.55 | 0.47 | 42.7 | 51.0 |
| 2130 | 2.5 | 1.05 | 10.4 | 9.7 | 0.52 | 0.45 | 50.5 | 57.1 |
| 2230 | 3.0 | 1.09 | 9.1 | 7.9 | 0.56 | 0.50 | 48.6 | 54.1 |

[1] as percent solids
[2] calculated as [(influent solids − filtrate solids)/influent solids] × 100

A range of percent mole charge from about 1 to 80%, a molecular weight of polymer from about 3,000,000 to 30,000,000, and polymer dosages of from about 0.025 to 25 pounds per ton active polymer to active furnish solids are preferred. In addition, cationic (meth)acrylamide copolymers with the following cationic monomers are all expected to be effective:

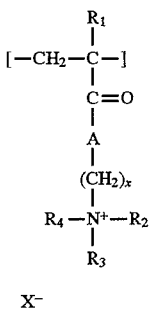

wherein $R_1$=H or $CH_3$; A=—NH or —O—; x=0–8; $R_2$, $R_3$, $R_4$ are each independently H, $CH_3$, $C_2$–$C_8$ alkyl, benzyl or $C_2$–$C_8$ alkyl benzyl; and X=Cl, F, Br, I or $SO_4$; or

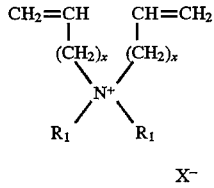

wherein x=0–8; $R_1$=H, $CH_3$, $C_2$–$C_8$ alkyl, benzyl or $C_2$–$C_8$ alkyl benzyl; and X=Cl, F, Br, I or $SO_4$.

Examples of specific cationic monomers are as follows:

AETAC - 2-acryloyloxyethyltrimethyl ammonium chloride

METAC - 2-methacryloyloxyethyltrimethyl ammonium chloride

APTAC - 3-acrylamidopropyltrimethyl ammonium chloride

MAPTAG - 3-methacrylamidopropyltrimethyl ammonium chloride

DADMAC - diallyldimethyl ammonium chloride, and the like.

Note that the DNT operation involves substrate feed into the interface of a plastic 100 to 200 mesh wire and a hardened plastic roll, typically operating at a wire speed of about 3000 linear feet per minute. The shear forces involved at this interface are designed to allow maximum flow of water and fine particles through the wire. These high shear forces would normally be expected to break, or reduce in size, the flocs produced by addition of polymeric flocculants, and thus increase the solids loss through the DNT wire. The improvements brought about by the present invention are significant in light of the severe conditions inherent in the operation.

The DNT employs a single pair of smooth-surfaced rolls and a single wire trained around those rolls so that it wraps substantially 180° of the surface of each roll. The pulp stock to be thickened is initially delivered to the inside of the wire run approaching the top of one roll so that the pulp is trapped in the wedge zone between the wire and the roll and caused to travel around the roll with the wire at sufficient rotational speed that centrifugal force causes liquid to be expressed through the wire from the pulp trapped between the wire and the roll.

The resulting partially dewatered pulp then travels on the lower wire run to the other roll, where it is similarly subjected to centrifugal force causing further expression of liquid through the wire. After thus traveling around the surfaces of both rolls, the pulp is removed from the surface of the second roll in the wedge zone defined by the roll surface and the wire run traveling therefrom to the first roll.

A special feature of the DNT takes advantage of the fact that paper pulp always tends to stick to the smoother of two surfaces with which it is brought into contact, which means that as the wire leaves the surface of the first roll, the pulp will tend to transfer from the inner surface of the wire to the roll. In accordance with the invention, a doctor is provided in wedge zone defined by the departing wire run and the roll surface which will remove the partially thickened pulp from the roll and redeposit it on the inner surface of the wire, accompanied by some mixing action. This partially thickened and redeposited pulp then travels on the wire to the second roll, and its mixed condition promotes more effective dewatering as it travels around the second roll.

Figure 2:
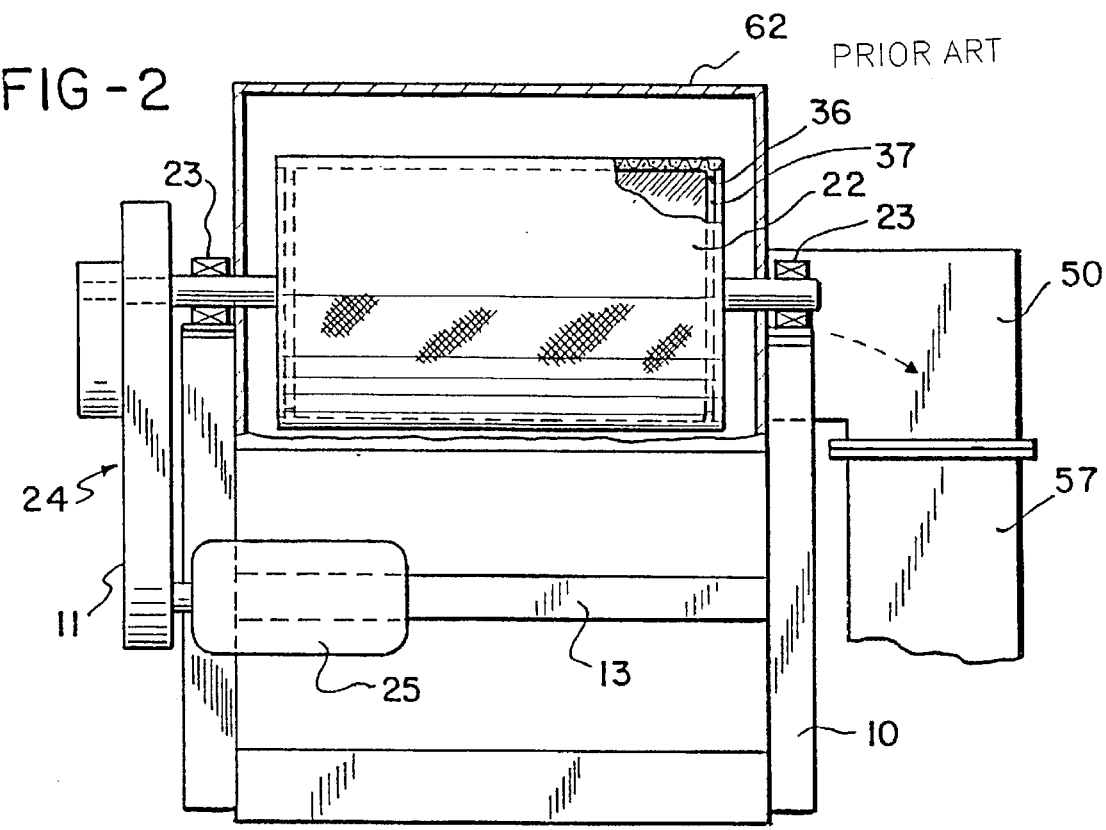
FIG. 2 is an end view of the prior art D.N.T. looking from right to left in FIG. 1 partly in section.
Figure 3:
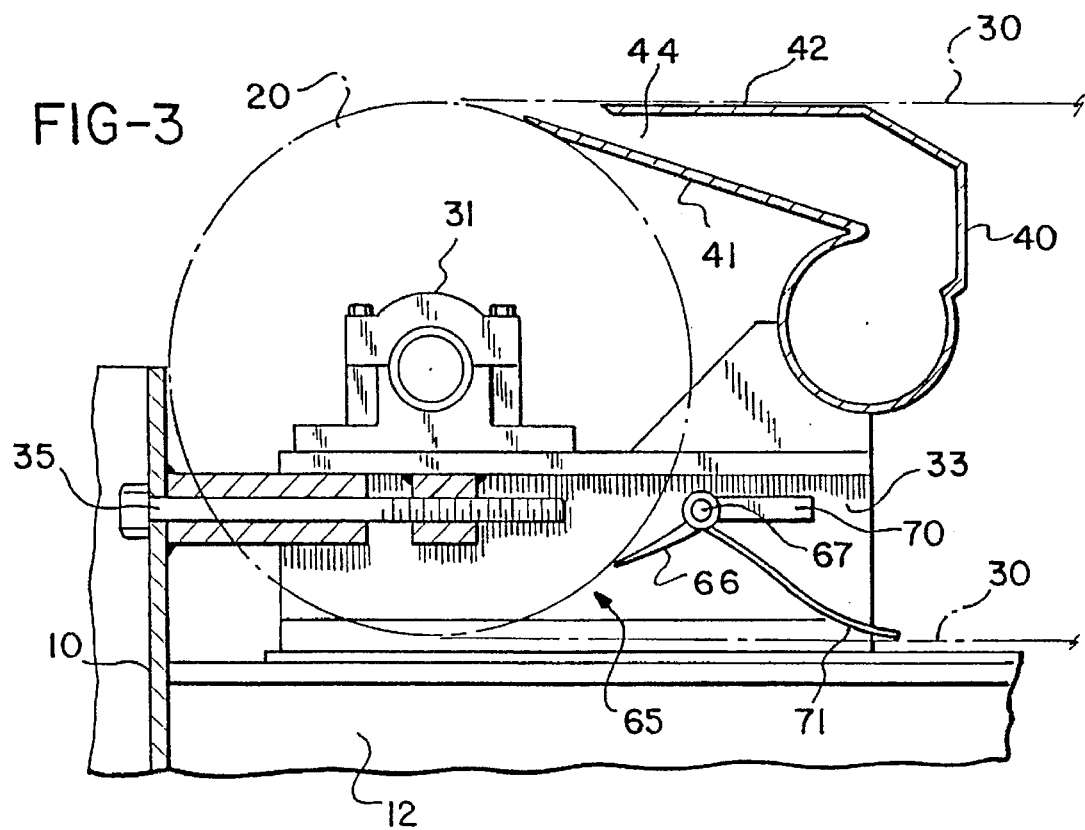
FIG. 3 is an enlarged fragmentary view illustrating the construction and operation of the doctor on a DNT.

One DNT is shown in FIGS. 1–3 and includes a relatively simple frame comprising two columns 10 and 11 on each side connected by side beams 12 and suitable cross braces 13. The two large rolls 20 and 22 which are the major operating elements of this apparatus are mounted at opposite ends of the frame, the roll 22 being shown as mounted by pillow blocks 23 on the tops of the columns 11. This roll 22 is the driven roll, through the belt drive indicated generally at 24 by a motor 25 mounted on the cross brace 13 between the columns 11. Both rolls are shown as of the same diameter, which is not essential, but if rolls of different diameters are used, the roll 20 which receives the suspension first should be the larger.

An endless loop of woven metal or plastic "vwire" 30 is trained around the rolls 20 and 22 and defines therewith a space in which the other operating parts of the apparatus are located. The roll 20 has an adjustable mounting on the frame which provides means for tensioning the wire 30, each of the journals of the roll 20 being mounted by a pillow block 31 on a base 33, shown as an I-beam, which is in turn mounted for sliding movement on the side beam 12. Means such as a pair of jack screws 35 connected between bases 33 and the adjacent columns 10 and 11 cause and control this movement to effect corresponding control of the tension in wire 30. Guiding of the wire may be effected by a strip 36 along one or both edges thereof which fits in a peripheral groove 37 in each of rolls 20 and 22.

A headbox 40 is mounted on the same base members 33 as the roll 20 so that it maintains a fixed spacing with respect to roll 20. This headbox is shown as of an open type including lower and upper walls 41 and 42 which extend upwardly to define a spout through which stock is discharged into the wedge zone 44 defined by the surface of the roll 20 and the upper run of wire 30 approaching the roll. The stock to be thickened is fed to one end of the headbox by any convenient feed line (not shown) from the usual stock supply pump (not shown).

At the other end of the space defined by the upper and lower runs of the wire 30 and the rolls 20 and 22 is a trough 50 having a screw conveyor 51 mounted in the bottom thereof for receiving thickened pulp from the surface of roll 22 in the wedge zone 52 defined by the roll surface and the upper run of wire 30 leaving this roll. The trough 50 includes a doctor 55 extending along its downstream edge which removes the thickened pulp from the surface of roll 22. An inclined wall 56 along the front edge of trough 50 prevents this pulp from being thrown beyond the trough, and the screw 51 forces the accumulated pulp to a chute 57 at the back of the machine which leads to the next station in the system.

In the operation of this apparatus, the pulp suspension to be thickened is constantly supplied to the wedge zone 44 from the headbox 40, and partially dewatered pulp is trapped between the wire 30 and the surface of roll 20. In order to increase the effectiveness of this action, the upper headbox wall 41 may terminate where it is engaged by the wire 30, at a position spaced by a substantial distance from roll 20 as shown in FIG. 1, or may extend only part way to the roll 20, as shown in FIG. 3, so that the stock is discharged directly against the inner surface of the portion of the wire traveling over it. Under these conditions, a substantial volume of water will be forced through the wire before the wire reaches roll 20, thereby effecting initial dewatering of the pulp to facilitate its being trapped between the wire and the surface of roll 20.

Proper control of wire tension also contributes to the effectiveness of the initial dewatering of the suspension in the wedge zone 44 and as the pulp travels therefrom around the surface of roll 20. More specifically, it is desirable that the wire tension not be so high as to make it difficult for the preliminary thickened suspension to enter the space between the wire and the surface of roll 20. In other words, if the wire tension is comparatively low, the pulp which has been subjected to initial dewatering as it approaches the small end of the wedge zone will more readily be trapped between the wire and roll 20 than if the wire if very tight. For reference purposes on this point, tests indicate that wire tension in the range of 1 to 40 pounds per linear inch is recommended.

With the wire maintained under relatively light tension as described, it will exert some pressure on the trapped pulp moving from the wedge zone 44 into the space between the wire and roll 20, thereby forcing liquid to be expressed therefrom through the interstices in the wire. The primary action of the wire, however, is to serve as a filter medium that holds the fiber on its inner surface against the action of centrifugal force, which is the major factor causing dewatering of the retained pulp. As a result of the restraining or retaining action of the wire on the pulp, it is possible to operate the apparatus of the invention at relatively high speeds, particularly in comparison with conventional deckers, e.g. at wire speeds in the range of 2100–3000 feet per minute using rolls 20 and 22 which are 24 inches in diameter.

The white water expressed in this manner through the wire is thrown into a trough 60 which extends under both rolls 20 and 22 and is provided with a drain outlet 61. A two-piece hood 62 is mounted on the frame above the apparatus as a whole, and it fits into the top of the trough 60 so that any water hitting the inner surface of this hood will drip therefrom into the trough.

As the thickened pulp between the wire and the surface of the roll 20 approaches the wedge zone 65 defined by roll 20 and the lower run of the wire leaving this roll, it will tend to transfer from the wire to the surface of the roll, as a result of the natural tendency of wet pulp to adhere to the smoothest available surface. Therefore, a doctor blade 66 is pivotally mounted at 67 on the base members 33 to extend the full width of this wedge zone 65 in position to remove the pulp 68 from the surface of the roll and redeposit it on the upper surface of the lower wire run. A counterweight 70 projecting from the back edge of blade 66 biases the front edge of the blade against roll 20, and an apron 71 of rubber or like material extends from the back edge of doctor blade 66 to assist in redepositing and smoothing this pulp on the wire. Other forms of doctor than a blade —such as an air doctor— could be used.

This operation will inherently also cause a certain amount of mixing of the pulp, which will therefore present a different face to the wire as it travels thereon to the roll 22, where the same combined actions of centrifugal force and wire tension will cause further expression of water through the wire. The resulting thickened pulp reaches the wedge zone 52 between the surface of roll 22 and the upper run of the wire, and this pulp will initially transfer from the wire to the roll surface, from which it is removed by the doctor 55 into the trough 50. A shower assembly 75 carried by the frame or the hood 62 washes any remaining pulp from the upper run of the wire and down onto the lower run traveling to the roll 22.

The operating capacity of DNT thickening apparatus provides a dramatic contrast with conventional deckers, starting with the fact that at the most, a decker is limited to increasing the consistency of feed stock at 1.5% solids to a maximum of approximately 4.5% solids. Further, a decker wherein the mold has a diameter of thirty-six inches, which is a conventional size, can handle only 0.5 tons per day for each inch of face, so that to handle 70 tons per day, the mold must be approximately twelve feet in length while the vat in which it operates is correspondingly longer.

In contrast, in a DNT wherein the rolls 20 and 22 are twenty-four inches in diameter and have their axes six feet apart, only fifteen inches of width is required to handle 70 tons per day at a feed consistency of 1.5% solids, and this apparatus will increase that consistency to between 9% and 12% solids. This astonishing increase in capacity—particularly in combination with the contrast in face width of the rolls—is materially contributed to by the much higher speed at which the apparatus of the invention will operate, namely speeds in the range of 1500–3000 feet per minute, whereas deckers are limited to a linear speed in the range of 200–300 feet per minute.

Not only does this greatly increased speed contribute to the higher capacity of the DNT apparatus in contrast to conventional deckers, but where a decker must operate at slow speed to minimize the effective centrifugal force on the pulp material on the surface of the cylinder mold, the substantially higher rotational speeds of the rolls as used in the DNT result in highly effective use of centrifugal force for expression of liquid through the wire. In addition, the apparatus of the invention is significantly simpler in construction than a decker, requiring only smooth-surfaced rolls and a short wire-covered structure of the cylinder mold which is the operating member of a decker.

The DNT thickening apparatus shown in FIGS. 4–5 incorporates a number of alternative additional features of the invention, and in these views, the same reference characters are used as in FIGS. 1–3 with 100 added thereto. One of these features involves the use of rolls 120 and 122 which have surface indentations wherein the pulp can be received while it is restrained against centrifugal discharge by the wire 130.

More specifically, as shown in FIG. 5, the roll 120 is provided with axially spaced circumferential grooves 121 separated by circumferential lands 126 on which the wire 130 is supported. As an example of dimensions which have been found satisfactory with a roll 120 having an outer diameter of 24 inches, the grooves 121 may be 0.187 inch in depth and 0.250 inch in width, while the lands 126 are 0.125 inch in width.

This arrangement of relatively wide grooves and narrow lands greatly increases the space wherein pulp can be retained by the portion of the wire 130 wrapping roll 120, without interfering with or otherwise affecting the centrifugal dewatering action described above in connection with FIG. 1. The same groove construction can also be provided for the roll 122, and blind indentations of other shapes can be used, such as multiple drilled holes, so long as the rolls remains impervious to liquid beyond the bottoms of any surface indentations therein.

The headbox 140 shown in FIG. 4 is of somewhat different construction from the headbox 40 in FIGS. 1 and 3, particularly in that its upper wall 142 is spaced below the upper run of the wire 130 and projects with the lower wall 141 most of the way into the wedge zone 144 defined by the wire 130 and roll 120 so that the stock to be thickened is delivered directly into the apex of this wedge zone rather than against the wire as in FIGS. 1 and 3. This headbox construction and arrangement have been found particularly applicable to DNT embodiments provided with grooved or otherwise surface indented rolls to assure that such surface indentations are filled with stock at the earliest possible instant.

Another feature illustrated in FIG. 4 relates to the handling of expressed white water which is rich in fines, as discussed above in the Summary of the Invention. More specifically, a save-all pan or shelf 180 is mounted at the end of hood 162 at the appropriate level to intercept the white water discharged through the wire as it travels through the first portion of its wrapping relation with roll 120, e.g. 45°–50°. This fines-rich fraction of the white water is recirculated by a pump 181 and line 182 to a shower pipe 183 or other distributing means located above the bottom run of the wire 130 as it travels from roll 120 to roll 122.

A valve 185 is adjustable to determine how much of the white water from pump 181 is supplied to the thickener and how much is transmitted to other white water collection means. This valve may be operated manually as determined by inspection of the operating conditions of the apparatus, but preferably it would be provided with some type of automatic control responsive to a condition such as the brightness of the discharge pulp or the consistency of the white water. For example, in the use of the apparatus of the invention in a deinking system, this valve could be adjusted automatically to maintain the brightness of the thickened pulp at a constant valve.

The selection and installation of such an automatic control is within the skill of the art, and such control is accordingly indicated diagrammatically at 186 in FIG. 4. It should also be noted that the spray pipe or other discharge means for fines-rich white water within the loop of wire 130 is subject to substantial variation, and specifically that the white water could be added by way of a spray system located to wash down whatever pulp build-ups might occur within the loop of the wire.

It is also possible in accordance with the invention to supply stock to be thickened to the interior of the wire loop just ahead of the roll 122 as well as at the roll 120. Thus as shown in FIG. 4, a headbox 190 like the headbox 140 can be installed in the wedge zone 152 defined by the roll 122 and the approaching lower run of the wire 130. With this arrangement, whether or not fines-rich white water is added as already described, the second supply of stock will be laid on top of the mat of partially thickened pulp traveling on the lower run of the wire, and this mat will have a filtering and retaining action on the fines deposited thereon. As previously noted, the second headbox 190 can be used and operated with or without the addition of fines-rich white water at the spray pipe 183.

When a secondary headbox 190 is used, it is desirable that the mat of pulp on the lower run of the wire be as smooth as possible. This result is readily obtained by the use of a grooved roll 120, because the doctor 66 of FIG. 1 is no longer needed, by reason of the fact that since the surface of the wire is then smoother than that of the roll, the pulp mat will remain as a smooth layer on the wire rather than transferring to the roll surface as in FIG. 1. In addition, the shower pipe 183, or a supplemental shower pipe, can be located in or near the wedge zone 165 to spray white water against the surface of roll 122 as it rises from the wire 130 to flush fiber therefrom down onto the pulp mat on the wire.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. In the deinking of wastepaper in which ink particles are removed from an aqueous slurry of recycled fibers, followed by a washing and thickening step wherein said slurry is treated to further remove ink particles from said recycled fibers, the improvement comprising adding to the slurry an effective amount of cationic polyacrylamide polymer to increase the retention of recycled fibers in said washing and thickening step.

2. The method as recited in claim 1 wherein from about 0.025 to 25 pounds of active polymer per ton of furnish solids is added to the aqueous papermaking system.

3. The method as recited in claim 1 wherein the cationic polyacrylamide polymer is a cationic (meth)acrylamide copolymer.

4. The method as recited in claim 3 wherein the cationic (meth)acrylamide copolymer comprises as a substituent a monomer:

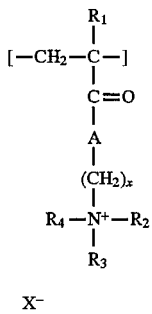

wherein $R_1$=H or $CH_3$; A=—NH or —O—; x=0-8; $R_2$, $R_3$, $R_4$ are each independently H, $CH_3$, $C_2$-$C_8$ alkyl, benzyl or $C_2$-$C_8$ alkyl benzyl; and X=Cl, F, Br, I or $SO_4$.

5. The method as recited in claim 3 wherein the cationic (meth)acrylamide copolymer comprises as a substituent a monomer:

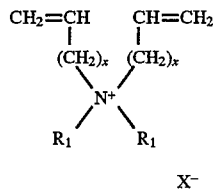

wherein x=0-8; $R_1$=H, $CH_3$, $C_2$-$C_8$ alkyl, benzyl or $C_2$-$C_8$ alkyl benzyl; and X=Cl, F, Br, I or $SO_4$.

6. The method as recited in claim 3 wherein said washing and thickening step is performed on a double nip thickener.

7. The method as recited in claim 1 wherein said cationic polyacrylamide polymer has a molecular weight of from about 3,000,000 to 30,000,000.

8. The method as recited in claim I wherein said cationic polyacrylamide polymer has a percent mole charge of from about 1 to 80%.

9. The method as recited in claim 1 wherein said cationic polyacrylamide polymer is a 2-acryloyloxyethyltrimethyl ammonium chloride/acrylamide copolymer.

10. In the manufacture of recycled fibers which includes (1) the repulping of recovered paper, followed by (2) the removal of printing inks from fibers, followed by (3) the treatment of the fibers through a double nip thickener in order to further remove contaminants, and retain furnish solids, the improvement comprising adding to said slurry an effective amount of a cationic polyacrylamide polymer to increase the retention of said furnish solids on said double nip thickener.

11. The method as recited in claim 10 wherein from about 0.025 to 25 pounds of active polymer per ton of furnish solids is added to the aqueous papermaking system.

12. The method as recited in claim 10 wherein the cationic polyacrylamide polymer is a cationic (meth) acrylamide copolymer.

13. The method as recited in claim 12 wherein the (meth) acrylamide copolymer comprises as a substituent a monomer:

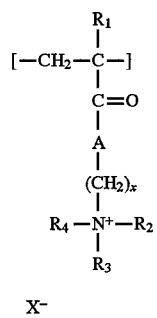

wherein $R_1$=H or $CH_3$; A=—NH or —O—; x=0-8; $R_2$, $R_3$, $R_4$ are each independently H, $CH_3$, $C_2$-$C_8$ alkyl, benzyl or $C_2$-$C_8$ alkyl benzyl; and X=Cl, F, Br, I or $SO_4$.

14. The method as recited in claim 12 wherein the cationic (meth) acrylamide copolymer comprises as a substituent a monomer:

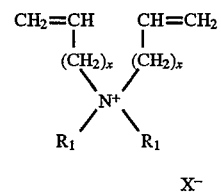

wherein x=1-8; $R_1$=H, $CH_3$, $C_2$-$C_8$ alkyl, benzyl or $C_2$-$C_8$ alkyl benzyl; and X=Cl,F,Br, I or $SO_4$.

15. The method as recited in claim 10 wherein said cationic polyacrylamide polymer has a molecular weight of from about 3,000,000 to 30,000,000.

16. The method as recited in claim 10 wherein said cationic polyacrylamide polymer has a percent mole charge of from about 1 to 80%.

17. The method as recited in claim 10 wherein said cationic polyacrylamide polymer is a 2-acryloyloxyethyltrimethyl ammonium chloride/acrylamide copolymer.

18. In the deinking of wastepaper in which ink particles are removed from an aqueous slurry of recycled fibers followed by a highspeed washing and thickening step wherein said slurry is treated to further remove ink particles from said recycled fibers, the improvement comprising adding to said slurry an effective amount of cationic polyacrylamide to increase the retention of furnish solids in said high speed washing and thickening step.

19. A method of treating a pulp slurry containinq contaminant solid particles and fiber solids in a washing/thickening device of the type having a rotating roller and a wire in close proximity to said roller, said roller and said wire in combination, defining a nip interface therebetween, said method comprising:

(1) treating said pulp slurry by adding a cationic polyacrylamide polymer thereto in an amount from about 0.025-25 pounds of said polymer per ton solids in said pulp slurry;

(2) feeding said pulp slurry to said nip; and (3) forcing water and at least some of said contaminant solid particles from said pulp slurry through said wire along said nip interface to separate at least some of said contaminants from said slurry, whereby the amount of fiber solids remaining with said pulp after said step (3) is increased in comparison to untreated pulp slurries.

20. The method as recited in claim 19 wherein the cationic polyacrylamide polymer is a cationic (meth) acrylamide copolymer.

21. The method as recited in claim 20 wherein the cationic (meth)acrylamide copolymer comprises as a substituent a monomer:

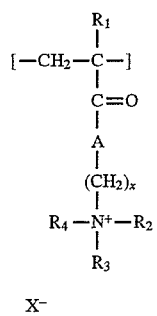

wherein $R_1$=H or $CH_3$; A=—NH or —O—; x=0–8; $R_2$, $R_3$, $R_4$ are each independently H, $CH_3$, $C_2$–$C_8$ alkyl, benzyl or $C_2$–$C_8$ alkyl benzyl; and X=Cl,F,Br, I or $SO_4$.

22. The method as recited in claim 20 wherein the cationic (meth)acrylamide copolymer comprises as a substituent a monomer:

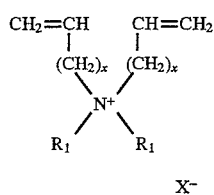

wherein x=0–8; $R_1$=H, $CH_3$, $C_2$–$C_8$ alkyl, benzyl or $C_2$–$C_8$ alkyl benzyl; and X=Cl,F,Br, I or $SO_4$.

23. The method as recited in claim 19 wherein said cationic polyacrylamide polymer has a molecular weight of from about 3,000,000 to 30,000,000.

24. The method as recited in claim 19 wherein said cationic polyacrylamide polymer has a percent mole charge of from about 1 to 80%.

25. The method as recited in claim 19 wherein said cationic polyacrylamide polymer is a 2-acryloyloxyethyltrimethyl ammonium chloride/acrylamide copolymer.

26. A method for increasing the amount of fibrous solids material retained in a pulp stock containing contaminant solid particles and said fibrous solids material treated in a washer/thickener device having a rotatable roller and a wire trained around a portion of said roller to define a nip location; said method comprising:

(1) adding a cationic polyacrylamide polymer to said pulp stock in an amount of about 0.025–25 pounds of said polymer per ton solids in said pulp slurry;

(2) feeding said pulp stock to said nip location and subjecting said pulp stock to centrifugal force thereat to express liquid and some of said contaminant solid particles through said wire.

27. The method as recited in claim 26 wherein the cationic polyacrylamide polymer is a cationic (meth) acrylamide copolymer.

28. The method as recited in claim 27 wherein the cationic (meth)acrylamide copolymer comprises as a substituent a monomer:

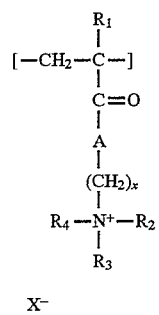

wherein $R_1$=H or $CH_3$; A=—NH or —O—; x=0–8; $R_2$, $R_3$, $R_4$ are each independently H, $CH_3$, $C_2$–$C_8$ alkyl, benzyl or $C_2$–$C_8$ alkyl benzyl; and X=Cl,F,Br, I or $SO_4$.

29. The method as recited in claim 27 wherein the cationic (meth)acrylamide copolymer comprises as a substituent a monomer:

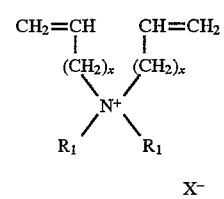

wherein x=0–8; $R_1$=H, $CH_3$, $C_2$–$C_8$ alkyl, benzyl or $C_2$–$C_8$ alkyl benzyl; and X=Cl,F,Br, I or $SO_4$.

30. The method as recited in claim 26 wherein said cationic polyacrylamide polymer has a molecular weight of from about 3,000,000 to 30,000,000.

31. The method as recited in claim 26 wherein said cationic polyacrylamide polymer has a percent mole charge of from about 1 to 80%.

32. The method as recited in claim 26 wherein said cationic polyacrylamide polymer is a 2-acryloyloxyethyltrimethyl ammonium chloride/acrylamide copolymer.

* * * * *